Oct. 23, 1923.
C. G. CLEMENT
EXTENSIBLE TRAILER
Filed March 19, 1920
1,471,549
2 Sheets-Sheet 1
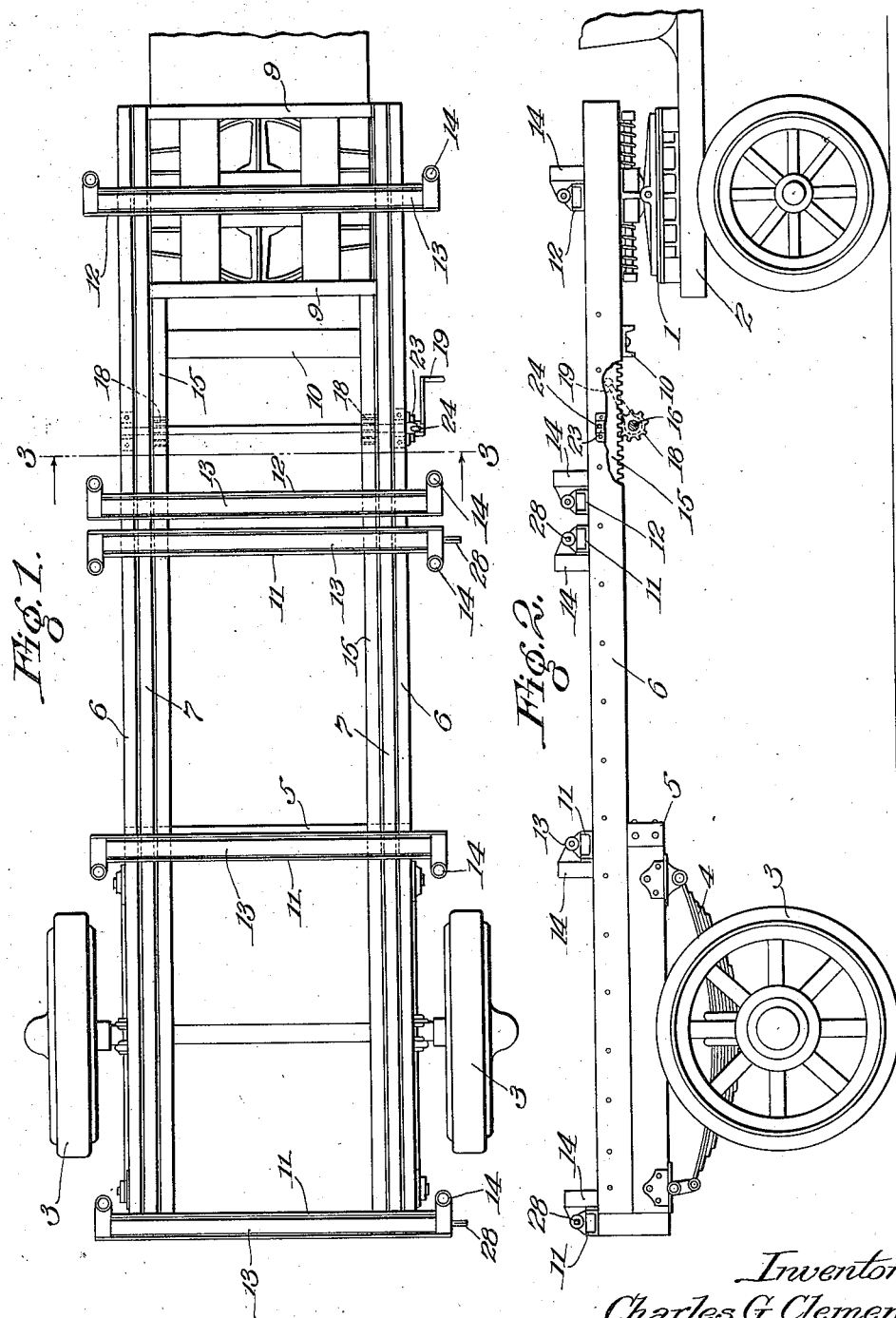
Witness:
P. J. Gathmann
Inventor:
Charles G. Clement
By Burlin & Burlin
his Attorneys Oct. 23, 1923.
C. G. CLEMENT
EXTENSIBLE TRAILER
Filed March 19, 1920
1,471,549
2 Sheets-Sheet 2
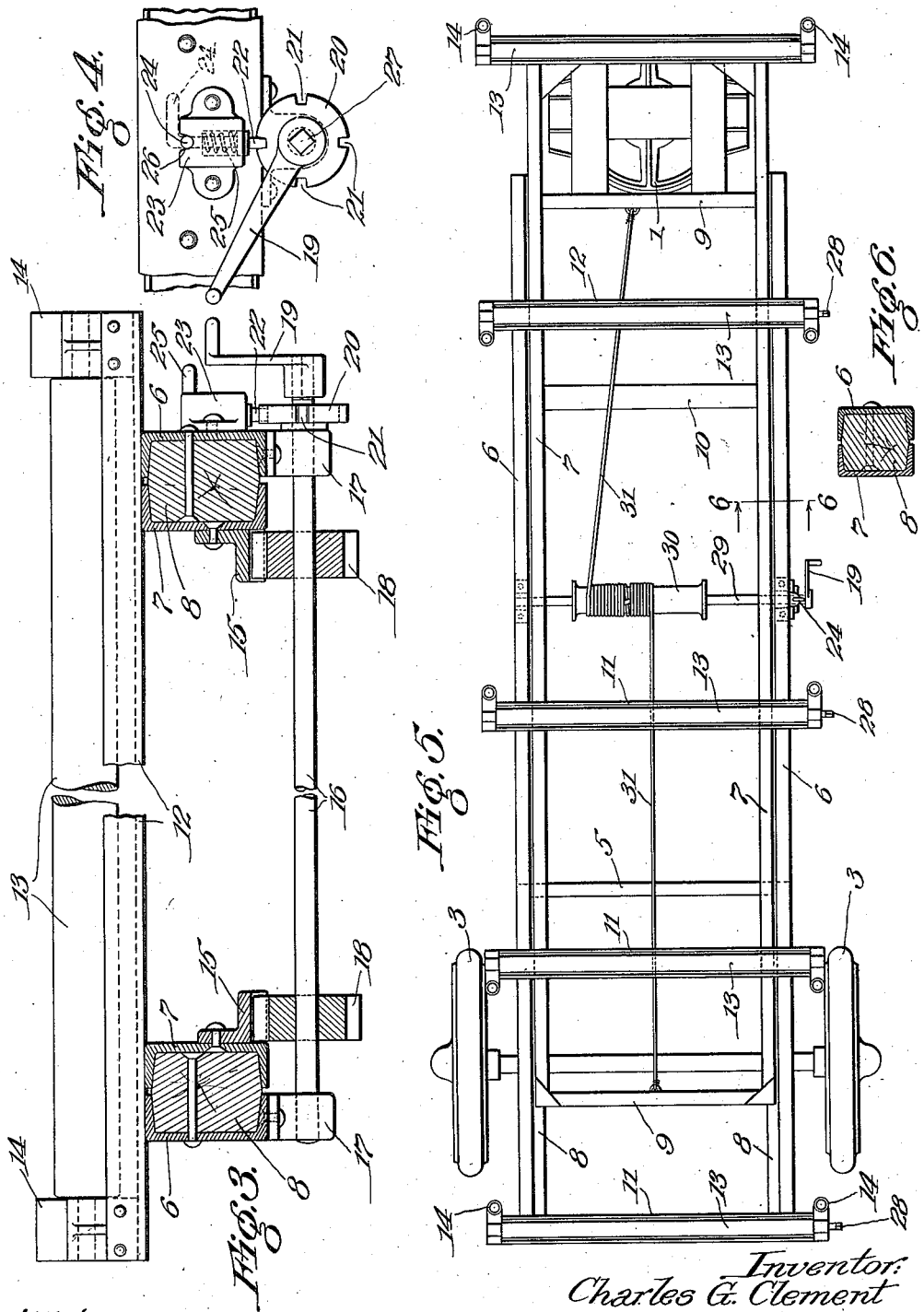

Patented Oct. 23, 1923.

1,471,549

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

EXTENSIBLE TRAILER.

Application filed March 19, 1920. Serial No. 367,160.

*To all whom it may concern:*

Be it known that I, CHARLES G. CLEMENT, a citizen of the United States, and a resident of Edgerton, in the county of Rock and State of Wisconsin, have invented certain new and useful Improvements in Extensible Trailers, of which the following is a specification, reference being had to the accompanying drawings, forming a part thereof.

The purpose of this invention is to provide an extensible load-supporting frame for a vehicle which will be economical to manufacture and simple to adjust for altering the length to accommodate longer or shorter loads. It is shown applied to a trailer in association with a motor truck or tractor. It consists in the features and elements of construction hereinafter described and shown in the drawings, as indicated in the claims.

In the drawings:—

Figure 1 is a top plan view of a trailer constructed in accordance with this invention.

Figure 2 is a side elevation including also a portion of a tractor vehicle to which it is attached.

Figure 3 is a detail section taken transversely, as indicated at line, 3—3, on Figure 1.

Figure 4 is a detail side elevation showing the adjusting means for changing the length of the frame, and the locking device therefor.

Figure 5 is a plan view of a slightly modified construction, showing the frame in partially extended position.

Figure 6 is a detail section, taken as indicated at 6—6 on Figure 5.

Since in general construction the two forms of the invention shown in Figures 1 and 5 respectively, are quite similar, the same reference characters have been applied to most of the parts and the same general description will apply to both. It will be understood that the invention is not limited in its application to a semitrailer of the type shown in the drawings, but that this form of vehicle has been chosen as a convenient one for purpose of illustration. Such a trailer is generally attached by means of a turn-table or fifth-wheel, 1, to a tractor vehicle indicated at 2 in Figure 2, and the trailer frame is supported on wheels, 3, with springs, 4, which may be attached to sub-frame, 5, above which there is mounted the load-carrying frame, 6. This is shown as a telescopic construction consisting of an outer pair of side members, 6, which may be of channel form, turned inwardly, and an inner pair of members, 7, of similar channel cross section turned outwardly and slidably supported upon runners, 8, which are bolted or riveted to the members, 6, and may be of any suitable material, hard maple wood having been found satisfactory for this purpose.

The inner frame members, 7, are connected by cross ties, 9, while the outer members, 6, are attached to the sub-frame, 5, and also provided with one or more cross ties, 10. In the drawings, the trailer is shown as adapted for carrying lumber or similar material, and for this purpose the frame members, 6, are also provided with transversely-extending channels, 11, and similar channels are connected at the forward end of the trailer to the frame member, 7, while each of the channels is provided with bearings for a roller, 13, and formed with stake pockets, 14, as shown in the drawings. Upon longitudinal extension of the frame, it may be understood that the supporting wheels, 3, and sub-frame, 5, being secured to the members, 6, will move rearwardly therewith and away from the tractor vehicle, 2, while the forward end of the inner frame, composed of the members, 7 and 9, remain attached to the tractor vehicle by means of the fifth wheel, 1. The channel members, 11, with their load-carrying members, 13, will move rearwardly with the frame members, 6, while the channels, 12, and their rollers, 13, will remain with the frame members, 7.

For conveniently effecting such adjustment, Figures 1, 2 and 3, show angle bars, 15, carrying gear teeth constituting a rack, and secured to the inner faces of the channel bars, 7, while a shaft, 16, is journaled in bearings, 17, attached to the frame members, 6, and a pair of gear pinions, 18, on said shaft, 16, mesh with the racks, 15, respectively, so that rotation of the shaft, 16, by means of a crank handle, 19, will feed the inner telescoping frame in one direction or the other along the slides, 8, according to the direction in which the shaft is rotated. For locking the two frames together at any desired position of such adjustment, disk, 20, on the shaft, 16, is provided with notches, 21, to receive a locking dog, 22, slidably mounted in a fitting, 23, secured to the side of the channel, 6, adjacent the operating crank 19. At its opposite end the dog, 22, has a transversely bent handle, 24, by which it may be drawn out of notches, 21, in opposition to the spring, 25, tending to hold it therein. When so withdrawn, the dog member may be rotated to the position shown in dotted lines in Figure 4, in which the bent handle, 24, is lodged upon the edge of the fitting, 23, with the dog withheld from the disk, 20. For again locking the disk, the handle, 24, is merely rotated 90 degrees, permitting it to drop into a notch, 26, in the fitting, 23, and allowing the dog, 22, to descend into one of the notches, 21. As shown, the end of the shaft, 16, is squared and the handle, 19, may be made removable so that it may be used on the squared end, 28, of the rollers, 13, for feeding the load on or off of the trailer when desired.

In a modified construction illustrated in Figure 5, the shaft, 16, is replaced by a shaft, 29, carrying a drum, 7, about which there is coiled a cable, 31, whose opposite ends extend respectively to the forward and rear ends of the inner frame, being secured to the cross members, 9, thereof. With this arrangement the adjustment of the telescoping frame is effected by merely rotating the shaft, 29, with its drum, 30, which feeds more of the cable onto one end of the drum and at the same time feeds off a corresponding amount at the other end, causing the drum, 30, and the frame member, 6, by which it is carried to travel longitudinally with respect to the frame member, 7. The parts may be secured in adjusted position by the same means as shown in Figure 4, in connection with the form of the device illustrated in Figures 1, 2 and 3.

I claim:

1. An extensible vehicle structure including two frames composed of an inner pair and an outer pair of metallic side bars with means connecting together the two bars of each pair, all of said side bars being of channel section with the outer channels facing inwardly and the inner channels facing outwardly, and a wooden guide rail secured in each of the channels of one pair and extending into the opposed adjacent channel of one bar of the other pair for slidably engaging one frame with the other to permit telescopic adjustment of said frames.

2. In the combination defined in claim 1, said wooden guide rails being secured to the outer pair of channels and slidably engaging the inner pair.

In testimony whereof, I have hereunto set my hand this 16th day of March, A. D. 1920.

CHARLES G. CLEMENT.